US012729154B2

(12) United States Patent
Watanabe

(10) Patent No.: US 12,729,154 B2
(45) **Date of Patent: *Sep. 8, 2026**

(54) EASY-TO-CLEAN-COATING-ATTACHED GLASS ARTICLE

(71) Applicant: Nippon Sheet Glass Company, Limited, Tokyo (JP)

(72) Inventor: Yoko Watanabe, Hyogo (JP)

(73) Assignee: NIPPON SHEET GLASS COMPANY, LIMITED, Tokyo (JP)

( * ) Notice: Subject to any disclaimer, the term of this patent is extended or adjusted under 35 U.S.C. 154(b) by 391 days.

This patent is subject to a terminal disclaimer.

(21) Appl. No.: 18/042,156

(22) PCT Filed: Aug. 20, 2021

(86) PCT No.: PCT/JP2021/030656

§ 371 (c)(1),
(2) Date: Feb. 17, 2023

(87) PCT Pub. No.: WO2022/039268

PCT Pub. Date: Feb. 24, 2022

(65) Prior Publication Data

US 2023/0322616 A1 Oct. 12, 2023

(30) Foreign Application Priority Data

Aug. 21, 2020 (JP) ................................ 2020-140042

(51) Int. Cl.

*C09D 1/00* (2006.01)
*C03C 17/25* (2006.01)
*C03C 17/34* (2006.01)

(52) U.S. Cl.

CPC .......... *C03C 17/25* (2013.01); *C03C 17/3417* (2013.01); *C09D 1/00* (2013.01); *C03C 2217/76* (2013.01); *C03C 2218/116* (2013.01)

(58) Field of Classification Search

None
See application file for complete search history.

(56) References Cited

U.S. PATENT DOCUMENTS 12,319,611 B2 6/2025 Mcneil et al.
2009/0304996 A1* 12/2009 Kishikawa ................ B32B 5/16 428/141

(Continued)

FOREIGN PATENT DOCUMENTS

EP 545347 A1 * 6/1993 ........... C03C 17/007
JP H01301517 A 12/1989

(Continued)

OTHER PUBLICATIONS

Extended European Search Report issued for European Patent Application No. 21858411.8, dated Nov. 15, 2024, 8 pages.

(Continued)

*Primary Examiner* — Kim S. Horger
(74) *Attorney, Agent, or Firm* — HSML P.C.

(57) ABSTRACT

The present disclosure provides a coating-attached glass article having improved easy-to-clean properties. The provided coating-attached glass article includes a glass substrate and an easy-to-clean coating on the glass substrate. The coating includes cerium oxide, and a contact angle of water on a surface of the coating is 60° or more and 130° or less. The coating improves, for example, the ease of removal of dirt resulting from a water drop adhered to the surface. The glass substrate may be formed of a reinforced glass.

12 Claims, 8 Drawing Sheets

(56) References Cited

U.S. PATENT DOCUMENTS

| | | | |
|---|---|---|---|
| 2012/0021177 | A1 | 1/2012 | Kawai et al. |
| 2012/0107558 | A1 | 5/2012 | Koval et al. |
| 2012/0282458 | A1 | 11/2012 | Takeda et al. |
| 2014/0004323 | A1 | 1/2014 | Bockmeyer et al. |
| 2015/0152558 | A1 | 6/2015 | Walther et al. |
| 2015/0354264 | A1 | 12/2015 | Inaoka et al. |
| 2017/0235418 | A1 | 8/2017 | Inamoto et al. |
| 2017/0274416 | A1 * | 9/2017 | Yeom ...................... C03C 17/22 |
| 2018/0050957 | A1 | 2/2018 | Moncur et al. |
| 2018/0245203 | A1 | 8/2018 | Li et al. |
| 2020/0339772 | A1 | 10/2020 | Taga |
| 2023/0192538 | A1 | 6/2023 | Mcneil et al. |
| 2025/0196473 | A1 | 6/2025 | Kawazu et al. |

FOREIGN PATENT DOCUMENTS

| | | | |
|---|---|---|---|
| JP | H08104543 | A | 4/1996 |
| JP | 2008119924 | A | 5/2008 |
| JP | 2013543833 | A | 12/2013 |
| JP | 2014500163 | A | 1/2014 |
| JP | 2014522433 | A | 9/2014 |
| JP | 2015116731 | A | 6/2015 |
| JP | 2015140277 | A | 8/2015 |
| JP | 5989802 | B2 | 9/2016 |
| JP | 2016183099 | A | 10/2016 |
| JP | 2018104233 | A | 7/2018 |
| JP | 2019001664 | A | 1/2019 |
| JP | 2019123872 | A | 7/2019 |
| JP | 2019151538 | A | 9/2019 |
| JP | 2019533632 | A | 11/2019 |
| WO | 2010007956 | A1 | 1/2010 |
| WO | 2011090035 | A1 | 7/2011 |
| WO | 2012061240 | A1 | 5/2012 |
| WO | 2016080432 | A1 | 5/2016 |
| WO | 2018085282 | A1 | 5/2018 |
| WO | 2019142830 | A1 | 7/2019 |

OTHER PUBLICATIONS

International Search Report and Written Opinion issued for International Patent Application No. PCT/JP2021/030656, Date of mailing: Oct. 12, 2021, 9 pages including English translation of Search Report.

International Search Report and Written Opinion issued for International Patent Application No. PCT/JP2021/026351, Date of mailing: Oct. 12, 2021, 12 pages including English translation of Search Report.

Extended European Search Report issued for European Patent Application No. 21841977.8, dated Jun. 24, 2024, 7 pages.

International Search Report, issued in PCT/JP2022/045327, PCT/ISA/210, dated Feb. 14, 2023 (7 pages including English translation).

Written Opinion of the International Searching Authority, issued in PCT/JP2022/045327, PCT/ISA/237, dated Feb. 14, 2023 (7 pages including English machine translation).

* cited by examiner

EASY-TO-CLEAN-COATING-ATTACHED GLASS ARTICLE

TECHNICAL FIELD

The present invention relates to an easy-to-clean-coating-attached glass article.

BACKGROUND ART

Films called easy-to-clean coatings are sometimes formed on surfaces of various substrates. The easy-to-clean coatings make it easy to remove dirt on the surfaces of the substrates. Easy-to-clean coatings typically include a fluorine-containing organic compound. A representative substrate on which an easy-to-clean coating is formed is a glass substrate. For example, a commercially-available coating liquid containing a fluoroalkyl-containing silicon alkoxide is applied onto a surface of a glass substrate to form an easy-to-clean coating.

Patent Literature 1 discloses a technique for providing an adhesion promoter layer between a glass substrate and an easy-to-clean coating. The adhesion promoter layer is specifically a silicon mixed oxide layer and makes easy-to-clean properties last longer.

CITATION LIST

Patent Literature

Patent Literature 1: JP 2014-522433 A

SUMMARY OF INVENTION

Technical Problem

Conventional easy-to-clean coatings reduce adhesion of dirt thereto by their high water repellency imparted by a fluorine-containing organic compound. However, according to studies by the present inventor, there is room for improvement in easy-to-clean properties imparted by a fluorine-containing organic compound.

The present invention aims to provide a coating-attached glass article having improved easy-to-clean properties.

Solution to Problem

The present invention provides a coating-attached glass article including: a glass substrate; and an easy-to-clean coating on the glass substrate, wherein the coating includes cerium oxide, and a contact angle of water on a surface of the coating is 60° or more and 130° or less.

Advantageous Effects of Invention

The present invention provides a coating-attached glass article having improved easy-to-clean properties.

DESCRIPTION OF EMBODIMENTS

The following description of embodiments of the present invention is not intended to limit the present invention to specific embodiments. The term "main component" as used herein means a component whose content is 50% or more, particularly 60% or more, on a mass basis. The phrase "substantially free" means that the content of a component is less than 1% or even less than 0.1% on a mass basis. The phrase "substantially flat" means that other than fine particles and projecting portions in a fine particle shape on a surface, no irregularities having a height or depth of 500 nm or more are observed using a SEM. The term "ordinary temperature" is used as a term that means a temperature in the range of 5 to 35° C., particularly 10 to 30° C.

A coating-attached glass article provided by the present embodiment includes:

a glass substrate; and an easy-to-clean coating on the glass substrate, wherein the coating includes cerium oxide, and a contact angle of water on a surface of the coating is 60° or more and 130° or less.

The coating-attached glass article provided by the present embodiment can be provided, for example, by a manufacturing method including:

applying a coating liquid containing cerium oxide as a solid or a coating liquid containing a chelated cerium ion onto a glass substrate to form a coating film on the glass substrate; and drying the coating film to form an easy-to-clean coating, wherein the cerium oxide includes $CeO_2$.

It has been assumed that the magnitude of the water contact angle is a measure of the easy-to-clean properties of easy-to-clean coatings. Because of this, a coating material that has been used is an organic material represented by a fluorine-containing organic compound and capable of achieving a high contact angle. However, actually, water drops adhered to a surface to which water repellency is imparted by a fluorine-containing organic compound are likely to leave spots of dirt on the surface when evaporate. This dirt is formed of fine particles or a solute having been contained in the adhered water drops and collecting in a small region of spot-like shape. Uneven distribution of dirt is often observed also on a glass surface on which no coating is arranged. Ring-shaped dirt left on a hydrophilic glass surface is sometimes called "coffee ring". Dirt left as a result of concentration in a spot-like or ring shape is noticeable, and removal of such dirt may be difficult depending on the degree of the concentration.

Figure 1:
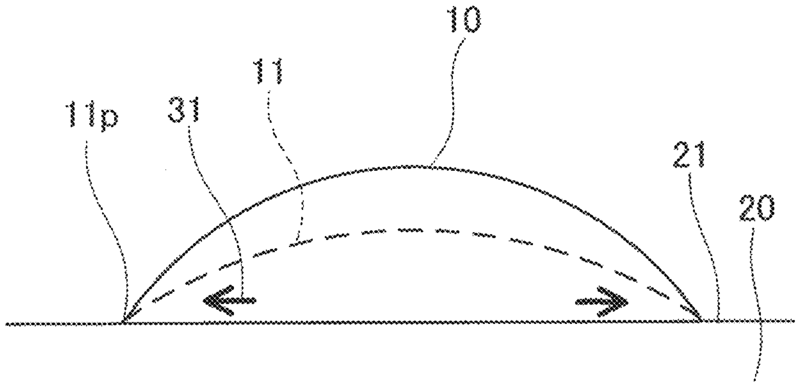
FIG. 1 is a schematic cross-sectional view illustrating progress of evaporation of a water drop on a hydrophilic surface.

How ring-shaped dirt is left can be understood from FIG. 1. A water drop 10 adhered to a hydrophilic surface 21 of a glass substrate 20 shrinks with the progress of moisture evaporation and disappears in the end. During the progress of the evaporation, the water drop 10 tends to shrink while keeping the area of contact with the hydrophilic surface 21. Accordingly, the water drop 10 more greatly shrinks at a center than at an edge. Inside a shrinking water drop 11, the shrinkage creates a flow 31 from the center toward an edge 11*p* in a vicinity of the surface 21 of the substrate 20. By this weak flow 31, a foreign matter contained in the water drop 11 or fine particles being a deposited solute collect to the edge 11*p* and deposit in a ring shape.

Figure 2:
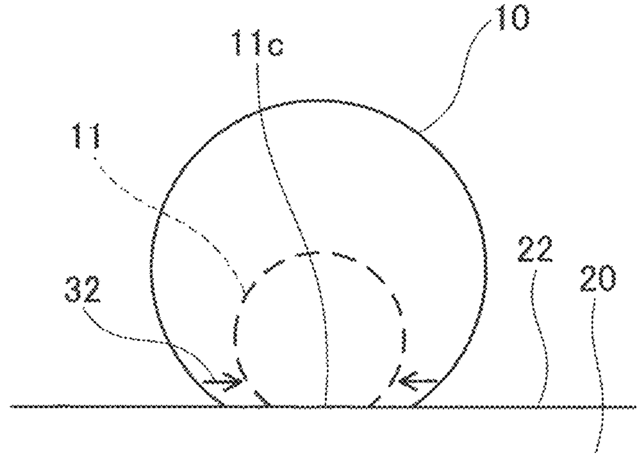
FIG. 2 is a schematic cross-sectional view illustrating progress of evaporation of a water drop on a surface to which water repellency is imparted by a fluorine-containing organic compound.

How dirt in a spot-like shape is left can be understood from FIG. 2. The water drop 10 adhered to the water-repellent surface 22 of the glass substrate 20 shrinks with the progress of moisture evaporation and disappears in the end. On the surface 22 to which water repellency is imparted by a fluorine-containing organic compound, the water drop 10 tends to shrink while keeping the high contact angle with the surface 22. Therefore, inside the water drop 10 shrinking to the smaller water drop 11, a flow 32 from an edge toward a center 11*c* is created in the vicinity of the surface 22 of the substrate. By this weak flow 32, fine particles contained in the water drop collect to the center 11*c* and deposit in a spot-like shape.

Unexpectedly, it has been revealed that dirt appearing as a result of evaporation of a water drop is not likely to concentrate on a cerium-oxide-including coating having a water contact angle of 60° or more and 130° or less, particularly 70° or more and 110° or less. In other words, a tendency of dirt resulting from a water drop to unevenly adhere to a particular part after evaporation of the water drop is reduced on this coating. It has also been confirmed that dirt relatively widely spread on this coating and adhered thereto is easily removed compared to dirt adhered thereto as a result of concentration. The coating-attached glass article according to the present embodiment reduces uneven distribution of adhered dirt and can have thereby-improved easy-to-clean properties. In the case of a surface to which water repellency is imparted by a fluorine-containing organic compound so that the water contact angle will be 60° to 130° as described above, spot-like dirt is left thereon. Taking this point into account, it is thought that not only the contact angle but also the cerium oxide contributes to exhibition of the easy-to-clean properties in the present embodiment. Furthermore, it is easy to wash an adhered organic substance off the coating-attached glass article according to the present embodiment. It is thought that the cerium oxide also contributes to improvement of the easy-to-clean properties exhibited against an adhered organic substance.

Unlike aluminum oxide, silicon oxide, and the like, cerium oxide can function as a water-repellent material. According to studies by the present inventor, the water repellency imparted by cerium oxide can be 75° or more, 80° or more, or even 85° or more as expressed in terms of the water contact angle. The contact angle of such a magnitude has been conventionally achieved by means of a surface treatment using a water-repellent agent being an organic substance. The water-repellent agent being an organic substance is commonly decomposed in the process of heating to approximately 300° C. Cerium oxide, on the other hand, is stable even when heated to a higher temperature.

In the present embodiment, the contact angle of water on the surface of the coating after exposure of the glass article to a thermal treatment at 760° C. for 4 minutes can be 60° or more and 130° or less, particularly 70° or more and 110° or less. The water contact angle after exposure to the thermal treatment can be 75° or more, 80° or more, or even 85° or more. However, in the present embodiment, the contact angle of water on the surface of the coating may be measured after a while from the thermal treatment because the contact angle of water on the surface of the coating can decrease temporarily just after the thermal treatment. It takes several tens of days in some cases to recover the contact angle. Therefore, the above contact angle may be measured, for example, after the thermal treatment of the glass article at 760° C. for 4 minutes and storage of the glass article in air at ordinary temperature for 40 days.

Hereinafter, the glass substrate and the coating included in the coating-attached glass article of the present embodiment will be described. Subsequently, properties that can be achieved by the present embodiment and applications of the article will be described, and, at the end, manufacturing methods of the present embodiment will be described.

(Glass Substrate)

The type of the glass forming the glass substrate is not particularly limited. The glass substrate may be formed of any of various glasses, such as soda-lime glass, borosilicate glass, aluminosilicate glass, alkali-free glass, and quartz glass. The glass substrate may include $SiO_2$ as its main component. The size and the shape of the glass substrate are not particularly limited, either. The glass substrate may be a glass sheet, a glass container, a glass lid, a glass tube, a glass bulb, a glass lens, or another formed body. The glass container is, for example, a glass vial, a glass ampoule, or a glass bottle, and may have another shape such as the shape of a tray or a Petri dish. The shape of the glass lid is not particularly limited as long as the glass lid functions as a lid, and the glass lid may have a shape, for example, allowing the glass lid to be used as a lid of a cooking device.

The glass sheet may have the shape of a flat plate, or may have a curved shape achieved by a bending treatment. The thickness of the glass sheet is not particularly limited, and is, for example, 0.5 to 12 mm. The glass sheet may be treated so as to be suitable for use as window glass of architecture, vehicles, and the like. The glass sheet may be subjected to, for example, a reinforcement treatment. In other words, the glass sheet may be formed of a reinforced glass. As the reinforcement treatment are known thermal tempering in which the glass sheet is rapidly cooled after heating to form a compressive stress layer on a surface of the glass sheet and chemical strengthening in which a compressive stress layer is formed on a surface of the glass sheet by ion exchange of alkali metal ions. The glass sheet may be integrated with another glass sheet by a lamination processing and/or a double-glazing processing. Afilm may be arranged on a surface of the glass sheet to impart or control properties other than the water repellency. Examples of the film include a Low-E film, a conductive film, a reflection-reducing film, and a colored film. The colored film is, for example, a ceramic coating. The ceramic coating is arranged for providing decorativeness, making a partial region opaque, or the like.

Many of the above treatments of glass sheets involve heating of the glass sheets. For example, the bending treatment of a glass sheet includes a step of softening the glass sheet by heating. In a lamination processing treatment and a double-glazing processing treatment as well as in the reinforcement treatment, glass sheets can be, in some cases, heated to a high temperature depending on the type of a resin film sandwiched by the glass sheets or the type of a sealant used to seal the space between the glass sheets. Easy-to-clean coatings including an organic substance greatly decrease the water repellency through heating in such treatments and impair their easy-to-clean properties. Because of this, coatings including an organic substance need to be formed after a treatment involving heating of glass sheets. Such a restriction on manufacturing steps can reduce the efficiency in mass production. For example, uniformly applying a coating liquid onto a curved surface is much more difficult than uniformly applying a coating liquid onto a surface of a flat plate. A step of applying a coating liquid onto a flat glass strip before cutting the flat glass strip and processing each of the resulting pieces to have a curved plane can be performed much more efficiently.

Such a water repellency decrease caused by a treatment involving heating can occur for not only glass sheets but also glass substrates in general. On the other hand, according to the present embodiment in which the water repellency is exhibited independent of an organic substance, a water repellency decrease caused by heating can be reduced. Hence, according to a method of the present embodiment, it is possible to subject the glass substrate to a wide variety of treatments, after the formation of the coating, in which the glass substrate having the water-repellent film thereon is heated. In the case of the glass sheet, the wide variety of treatments include, for example, at least one selected from the group consisting of a bending treatment (heat bending treatment), a thermal tempering treatment, a chemical strengthening treatment, a lamination processing treatment, a double-glazing processing treatment, and a film formation treatment which involve heating, and are particularly a heat bending treatment and/or a thermal tempering treatment. That is, in the present embodiment, the glass substrate may be a glass sheet subjected to at least one treatment selected from the group consisting of a heat bending treatment and a thermal tempering treatment. The temperature set in the above thermal treatments is commonly, at most, approximately 760° C. or lower.

Conventionally, a glass sheet is subjected to a heat bending treatment and/or a thermal tempering after being cut into a given shape, and then a coating liquid for formation of an easy-to-clean coating is applied to a principal surface of the glass sheet. Therefore, a portion of the coating liquid is attached to an edge face of the glass sheet and the coating is formed also on at least a portion of the edge face. On the other hand, according to the present embodiment, it is possible to form the water-repellent film by applying the coating liquid onto a principal surface of a flat-plate-shaped glass sheet and thereafter subject the glass sheet to at least one treatment selected from the group consisting of a heat bending treatment and a thermal tempering treatment. The glass sheet provided by this embodiment can be a glass sheet having the coating on at least one principal surface of the glass sheet, and not having the coating on an edge face of the glass sheet. The coating can be locally thick at the edge face where the coating liquid tends to stay. Therefore, avoidance of the formation of the coating being locally thick at the edge face is advantageous, for example, in ensuring a fine product appearance. In addition to such quality improvement, the glass sheet provided by this embodiment also contributes to reduction in end product cost because a coating treatment can be continuously applied to the uncut glass sheet having a large area.

(Coating)

The easy-to-clean coating includes cerium oxide. The cerium oxide may account for 10 mass % or more or 30 mass % or more of the coating. Furthermore, the coating may include the cerium oxide as its main component. The coating may be substantially free of a component other than the cerium oxide. The coating may have a surface on which the cerium oxide is exposed. The cerium oxide preferably includes $CeO_2$, namely, an oxide of tetravalent cerium. $CeO_2$ is a more desirable component than $Ce_2O_3$, namely, an oxide of trivalent cerium, in terms of increasing the easy-to-clean properties. However, the coating may include $Ce_2O_3$ as the cerium oxide. For example, in the case where a compound including trivalent cerium is used as a source of the cerium oxide and a portion thereof is oxidized to tetravalent cerium, the rest of the trivalent cerium is included as $Ce_2O_3$ in the coating together with $CeO_2$.

Easy-to-clean coatings on substrates formed of, for example, glass commonly have a multi-layer structure composed of a metal oxide layer serving as an underlayer and an overcoat layer formed of an organic compound. The overcoat layer is often formed of a hydrolysis polycondensation product of a hydrolyzable organic silicon compound so as to be firmly bonded to the metal oxide layer. The hydrolyzable organic silicon compound is an organic compound, typically a fluoroalkyl-containing compound, suitable for improvement of the water repellency. On the other hand, in the present embodiment, the coating may be substantially free of a hydrolysis polycondensation product of the hydrolyzable organic silicon compound. The coating may be substantially free of a fluorine-containing organic compound, particularly a fluoroalkyl-containing compound.

The coating may be a single-layer film or may be a multi-layer film formed of a plurality of layers. The coating being a single-layer film is advantageous in reducing mass production cost. Even when the easy-to-clean coating of the present embodiment is a single-layer film, the easy-to-clean coating can maintain its easy-to-clean properties. When the coating of the present embodiment is a multi-layer film, the coating desirably includes a layer including the cerium oxide as a topmost layer of the multi-layer film. In other words, in the present embodiment, an underlayer may be disposed between the glass substrate and the coating. The underlayer is, for example, a metal oxide layer. Specifically, the underlayer may be a layer having a lower cerium oxide content on a mass basis than that in the coating being an outer layer, or may be a layer substantially free of cerium oxide. The underlayer may include at least one selected from the group consisting of silicon oxide, aluminum oxide, zirconium oxide, and titanium oxide. One desirable example of the underlayer is a layer including silicon oxide as its main component. The underlayer itself may be formed of a plurality of layers. The underlayer formed of a plurality of layers may be, for example, a Low-E film.

The easy-to-clean coating of the present embodiment can achieve a water contact angle of 60° or more, 65° or more, 70° or more, 75° or more, even 80° or more, 85° or more, or, in some cases, 90° or more. The upper limit of the water contact angle is not particularly limited, and is, for example, 130° or less, 120° or less, 110° or less, 105° or less, even 100° or less, or 95° or less. The water contact angle can be measured for 4 mg (about 4 μL) of purified water dropped onto the surface of the coating.

The easy-to-clean coating of the present embodiment does not completely lose its water repellency even when heated to a high temperature, for example, to 500° C. or even 760° C. The coating of the present embodiment can achieve, for example, a water contact angle of 60° or more, 65° or more, 70° or more, 75° or more, even 80° or more, 85° or more, or, in some cases, 90° or more and of 130° or less, 120° or less, 110° or less, 105° or less, even 100° or less, or 95° or less, even after exposure of the glass article to the thermal treatment at 760° C. for 4 minutes.

Although the details of the reason are unknown, the water repellency of the easy-to-clean coating of the present embodiment can temporarily decrease after the easy-to-clean coating is heated at a high temperature. Moreover, a water repellency value can be unstable shortly after the formation of the film and a low value can be shown then. However, even in such cases, just by storing the coating in air at ordinary temperature, the water contact angle gradually increases and becomes stable, and the contact angle as described above is achieved. According to studies by the present inventor, a period of time required for recovery and stabilization of the contact angle is about 30 to 40 days. Therefore, the contact angle of the coating having undergone a thermal treatment at a high temperature is desirably measured after storage in air at ordinary temperature for a given period of time.

The easy-to-clean coating may include an organic component. The organic component may be an organic compound, or may be an organic group bonded to, for example, an oxide forming the coating. The content of the organic component in the coating is not particularly limited. The content of the organic component in the coating may be 0.01% or more or even 0.1% or more on a mass basis, and may be 10% or less or even 1% or less on a mass basis. The content of the organic component can be relatively large in the coating not exposed to a thermal treatment at a high temperature. However, the coating may be substantially free of the organic component.

The organic group included in the easy-to-clean coating may include an epoxy group. The epoxy group is a preferred functional group suitable for use in a later-described manufacturing example. As described later, the epoxy group is consumed by a reaction with another component, specifically, an acid. However, the epoxy group can remain in the coating when added excessively. The epoxy group remaining in the coating functions as a crosslinking agent particularly in the thermal treatment and can affect the structure of the film.

The easy-to-clean coating may include an inorganic compound other than the cerium oxide. Examples of the oxide other than the cerium oxide can include silicon oxide, aluminum oxide, zirconium oxide, titanium oxide, ruthenium oxide, and oxides of rare earths other than cerium. The cerium oxide is more easily available and less expensive than other rare earth oxides. The coating does not need to include a rare earth oxide other than the cerium oxide. The inorganic compound may be other than an oxide, and may be, for example, a nitride, a carbide, or the like.

A thickness of the easy-to-clean coating is, for example, 2 to 1000 nm and particularly 5 to 500 nm. The thickness of the coating may be 7 nm or more, or even 10 nm or more, and may be 300 nm or less or even 200 nm or less.

The easy-to-clean coating may have a dense structure, or may have a pore inside. A porosity of the coating may be, for example, 20% or more, 25% or more, 30% or more, or, in some cases, 40% or more, and may be 85% or less, 70% or less, 60% or less, or, in some cases, 50% or less. The coating having an appropriate porosity can have excellent optical properties. Specifically, control of the porosity can achieve elimination of an interference color that can be exhibited by the coating, improvement of the visible transmittance and the reflectance, and the like.

The easy-to-clean coating may have a plurality of fine particles on the surface. The fine particles may be fine cerium oxide particles. In other words, a portion of the cerium oxide included in the coating may be included in the form of fine particles exposed on the surface of the coating. The surface of the coating may be substantially flat. As described above, whether the surface of the coating is substantially flat or not is judged by the flatness of the surface excluding the fine particles, that is, by excluding the irregularities provided by the fine particles. The particle diameter of the fine cerium oxide particle may be 100 nm to 1.5 μm or even 250 nm to 1 μm. The particle diameter of the fine particle can be measured by SEM observation. The fine particles having the above particle diameter may be present on the surface of the coating at a density of 1 to 100 particles or even 2 to 20 particles in a 5 $\mu m^2$ area of the coating surface. The presence of the fine particles can contribute to improvement of the water repellency through development of the small irregularities.

The crystallite size of the fine cerium oxide particle included in the easy-to-clean coating is not particularly limited, and may be, for example, 1 to 100 nm or even 2 to 20 nm.

When the glass substrate is a glass sheet, the easy-to-clean coating may be arranged on only one principal surface of the glass sheet, or may be arranged on both principal surfaces of the glass sheet. However, to prevent a decrease in visible transmittance, the coating is desirably arranged on only one principal surface of the glass sheet.

(Properties)

The water repellency the glass article of the present embodiment can provide is as described above. In addition to this, the glass article of the present embodiment can have, for example, the following optical properties. A visible transmittance of the glass article may be 65% or more, 70% or more, 80% or more, or even 85% or more. The upper limit of the visible transmittance is not particularly limited, and is, for example, 95%. A visible reflectance of the glass article may be 20% or less, 15% or less, 10% or less, or even 8% or less. The lower limit of the visible reflectance is not particularly limited, and is, for example, 2%. The visible reflectance refers to a visible reflectance at the surface on which the coating is arranged. In other words, the visible reflectance refers to a reflectance of visible light coming from the outside of the glass article through the coating and reaching to the glass substrate. A haze ratio of the glass article is, for example, 20% or less, and is preferably 10% or less, even 5% or less, or particularly 4% or less. According to the present embodiment, a haze ratio of 1% or less or even 0.5% or less.

The preferred ranges of the visible transmittance, the visible reflectance, and the haze ratio are as follows. More preferred ranges thereof are shown in the parentheses.

Visible transmittance: 80% to 95% (85% to 95%)

Haze ratio: 5% or less (4% or less)

Visible reflectance of the surface of the glass substrate on which the coating is arranged: 2 to 20% (2% to 8%)

(Applications of Article)

The coating-attached glass article according to the present embodiment can be used in various applications, and is particularly suitable for use as a glass article used in an environment in which a water drop adheres thereto. The water drop is commonly supplied from natural water, such as rain or mist, or tap water. The coating-attached glass article according to the present embodiment may be, specifically, an article being at least one selected from the group consisting of glass for architecture, glass for transport vehicles, glass for stores, glass for furniture, glass for home appliances, glass for signage, glass for mobile devices, and glass for solar cells. The coating-attached glass article according to the present embodiment may be an article being at least one selected from the group consisting of window glass, roof glass, glass for bathrooms, mirrors, glass for stores, glass for mobile devices, and glass for solar cells. Examples of the window glass include window glass of architecture and transport vehicles, and examples of the roof glass include the same. The architecture includes not only houses and tall buildings but also greenhouses, arcades, and other constructions fixed on lands. The transport vehicles include vehicles, vessels, and aircrafts. Examples of the vehicles include motor vehicles and railroad cars. Examples of the glass for bathrooms include glass partitions and glass doors of bathrooms. Examples of the mirrors include mirrors in bathrooms and mirrors of bathroom vanities. Examples of the glass for stores include display windows, counters, tables, glass doors of refrigerated cases and freezer cases, and showcases of foods, etc. Examples of the glass for mobile devices include glass covering displays of mobile devices such as smartphones and tablet PCs and, in some case, glass of housings of mobile devices. Examples of the glass for solar cells include cover glasses disposed on the light incident side of solar cells. In particular, when safety of human body needs to be ensured, a reinforced glass is often used in the above applications.

(Manufacturing Method)

Next, methods for manufacturing the glass article of the present embodiment will be described. However, the glass article of the present embodiment may be manufactured by a method other than the following manufacturing methods.

The manufacturing method of the present embodiment includes: applying a coating liquid containing cerium oxide as a solid onto the glass substrate to form a coating film on the glass substrate; and drying the coating film. The cerium oxide includes $CeO_2$. It should be noted that the cerium oxide as a solid is not necessarily present as a complete oxide as long as cerium oxide is supplied to the coating. The term "cerium oxide" as a solid includes a cerium oxyhydroxide and a cerium hydroxide that can supply cerium oxide after dehydration condensation.

This manufacturing method may further include preparing the coating liquid. The coating liquid may contain a polar solvent, particularly a lower alcohol having 5 or less carbon atoms, as a solvent. The lower alcohol may be methanol and/or ethanol. The step of preparing the coating liquid may include hydrolysis of a cerium compound including trivalent cerium. The hydrolyzable cerium compound is preferably a compound soluble in the polar solvent, and, specifically, may be selected from water-soluble cerium compounds. The cerium compound may be, for example, at least one selected from the group consisting of a halogenated cerium and cerium nitrate. The halogenated cerium is, for example, cerium(III) chloride or cerium(III) bromide. The cerium compound is preferably a compound of trivalent cerium, as described above as examples including cerium(III) nitrate. However, the cerium compound is not limited to the compound of trivalent cerium, and may include tetravalent cerium.

In a common sol-gel process, an acid or an alkali is added to a coating liquid to accelerate hydrolysis of a metal compound. In the manufacturing method of the present embodiment, an acid or an alkali may be added, too. However, a more preferred additive is an organic compound functioning as an acid scavenger, and is specifically an epoxy-containing organic compound, particularly a water-soluble epoxide. The water-soluble epoxide is an epoxy-containing compound having a solubility of 1 g/100 mL or more in water at 20° C. The water-soluble epoxide may be a monofunctional epoxide or a polyfunctional epoxide. The monofunctional water-soluble epoxide may be, for example, an epoxy-containing alkane such as propylene oxide (1,2-epoxypropane) or 1,2-epoxybutane, glycidyl ether of a lauryl alcohol EO adduct, glycidyl ether of a phenol EO adduct, or the like. The polyfunctional water-soluble epoxide is, for example, glycerol polyglycidyl ether, polyglycerol diglycidyl ether, or sorbitol polyglycidyl ether.

As described above, in the manufacturing method of the present embodiment, the cerium compound preferably undergoes hydrolysis under the presence of the water-soluble epoxide. The hydrolysis of the cerium compound under the presence of the water-soluble epoxide results in consumption of an acid generated by the hydrolysis of the cerium compound, accelerating the hydrolysis reaction. Moreover, in the coating liquid to which the water-soluble epoxide is excessively added, tetravalent cerium is more likely to be yielded from trivalent cerium. This phenomenon is thought to be due to improvement of the stability of tetravalent cerium in a range at a high pH.

The prepared coating liquid is applied onto the glass substrate. The coating liquid is applied, for example, by a known method such as spin coating, bar coating, spray coating, nozzle flow coating, or roll coating.

The manufacturing method of the present embodiment may further include subjecting the coating film to at least one treatment selected from washing and drying. The coating film formed by the application and still in a wet state includes, together with the cerium oxide, the organic compound, such as the water-soluble epoxide and a product resulting from a ring-opening reaction thereof, contained in the coating liquid. At least a portion of the organic compound in the coating film in a wet state is removed from the coating film by a treatment which is washing and/or drying, particularly, by washing. An organic solvent, particularly, a polar organic solvent having 5 or less carbon atoms, is suitable as a solvent used in the washing. One preferred example of the washing is performed using a lower alcohol and a ketone sequentially. The lower alcohol is, as described above, an alcohol having 5 or less carbon atoms. The ketone is preferably a ketone having 7 or less, 5 or less, or even 3 or less carbon atoms. By the removal of the organic compound, pores are formed in the dried coating, and small irregularities can be formed on the surface of the dried coating. The porosity and the sizes of the small irregularities can be controlled, for example, by the amount of the organic compound. The manufacturing method described above as an example is particularly suitable for forming an easy-to-clean coating having a desired porosity and desired small irregularities.

The above-described oxidation of trivalent cerium to tetravalent cerium requires time in some cases. Therefore, the manufacturing method of the present embodiment may further include holding at least one selected from the coating liquid and the coating film in a wet state just for a given period of time. This step can be performed, for example, by holding at least one selected from the prepared coating liquid and the coating film in a wet state at a temperature of 5 to 80° C. for 0.5 to 48 hours. This step allows what is called "aging" of the coating liquid or the coating film to take place, increasing the rate of tetravalent cerium. A preferred aging target is the coating liquid. For example, for the coating liquid, a color attributed to tetravalent cerium starts to be observed as conversion to tetravalent cerium progresses. The coating liquid containing only trivalent cerium is colorless if not containing another material that causes coloring. Typically, the coating liquid can be colored a brownish color first and then a yellowish color as more tetravalent cerium is generated. In order to generate a sufficient amount of tetravalent cerium during the period of holding, the pH of the coating liquid is desirably maintained so as not to be too low. For example, the amount of the water-soluble epoxide functioning as an acid scavenger is appropriately adjusted to control the pH.

The process of generation of tetravalent cerium can be monitored in absorption spectra from an ultraviolet region to a visible region. For example, an absorption edge of the coating liquid in the ultraviolet region shifts to the long wavelength region side as more tetravalent cerium is generated. When the aging continues until this absorption edge shifts to be in a region of, for example, 350 nm or more, particularly 360 nm or more, a sufficient amount of tetravalent cerium to form the easy-to-clean coating is generated.

The preferred amount of the water-soluble epoxide depends on, for example, the type of the water-soluble epoxide. When the water-soluble epoxide is propylene oxide, a mixing ratio between cerium(III) included in the cerium compound and propylene oxide may be, in a molar ratio, 1:10 to 1:90, 1:15 to 1:80, even 1:20 to 1:70, particularly 1:25 to 1:50.

The epoxy-containing organic compound such as the water-soluble epoxide may be further supplied after the hydrolysis of the cerium compound. The supply of the epoxy-containing organic compound may also achieve washing of the film. The supply of the epoxy-containing organic compound to the film after the hydrolysis can contribute to early stabilization of the water contact angle after the coating formation. The supply of the epoxy-containing organic compound after the hydrolysis can also contribute to improvement of the water contact angle after the thermal treatment.

The manufacturing method of the present embodiment may further include subjecting the glass substrate to a treatment involving heating after the formation of the easy-to-clean coating on the glass substrate. The treatment involving heating is at least one selected from the group consisting of the above examples, and is particularly a heat bending treatment and/or a thermal tempering treatment. It should be noted that the glass substrate of the present embodiment can be used without these treatments.

The manufacturing method of the present embodiment can also be performed as a method including: applying a coating liquid containing a chelated cerium ion onto the glass substrate to form a coating film on the glass substrate; and drying the coating film. To chelate a cerium ion, a common chelating agent such as EDTA or acetylacetone can be used without particular limitations. The cerium ion in the coating liquid may be trivalent cerium. At least a portion of the chelated trivalent cerium ion is quadruply oxidized easily in the drying step after the application of the coating liquid and further in a heating treatment step. The manufacturing method using chelation does not need the action of an acid scavenger such as the water-soluble epoxide. Except for this point, the manufacturing method using chelation can be performed in the same manner as in the above method.

(Other Manufacturing Methods)

The easy-to-clean-coating-attached glass article of the present embodiment is not limited to one manufactured by liquid-phase deposition described above as an example. The easy-to-clean-coating-attached glass article of the present embodiment can be manufactured, for example, by a reduced-pressure film formation method typified by sputtering.

Hereinafter, the present invention will be described in more detail with reference to examples. The following examples are not intended to limit the present invention to specific embodiments.

First, methods for measuring properties will be described.

(Porosity)

Optical parameters of films were determined by spectral analysis of reflected light using an ellipsometer (DVA-FL manufactured by Mizojiri Optical Co., Ltd.). For the determination, the laminate structure of a coating-attached glass sheet was defined as consisting of a glass sheet (refractive index: 1.52) and a coating (refractive index: 2.2, in the case where the porosity is 0). The refractive index and the thickness of the coating were calculated by fitting, and the porosity thereof was calculated.

(Optical Properties)

The visible transmittance and the visible reflectance were determined from a visible-ultraviolet absorption spectrum measured using a spectrophotometer (330 manufactured by Hitachi, Ltd.). The haze ratio was measured using a haze meter (HZ-V3 manufactured by Suga Test Instruments Co., Ltd.).

(Water Contact Angle)

An amount of 4 mg of purified water was dropped onto a surface of each coating using a contact angle measurement apparatus (DMs-401 manufactured by Kyowa Interface Science Co., Ltd.) to measure a water contact angle. It should be noted that the formed coating was left in air at ordinary temperature for 20 days before the measurement of the water contact angle. A water contact angle after a thermal treatment was measured after each coating-attached glass sheet having undergone the thermal treatment was left in air at ordinary temperature for 40 days.

(Thermal Treatment)

Each coating-attached glass sheet was heated in an electric furnace set at 760° C. for 4 minutes, taken out of the furnace, wrapped in ceramic wool, and then cooled to room temperature at a cooling rate at which heat cracking does not occur. The water contact angle, etc. were measured after the thermal treatment, too.

(Dirt Adhesion Test: Tap Water)

Tap water was sprayed on the coating surface of each coating-attached glass sheet in such a position that a principal surface of the coating-attached glass sheet faced a vertical direction. Next, the glass sheet was held in an atmosphere at 70° C. for 10 minutes to evaporate water drops adhered on the coating surface. After that, light from an LED light source was incident on an edge face of the coating-attached glass sheet, and the coating surface was observed.

(Dirt Adhesion Test: Hand Soap)

A commercially-available hand soap (product name: Kirei Kirei Medicated Foam Hand Soap; manufactured by Lion Corporation) diluted with water to a concentration of 20 mass % was dropped onto the coating surface of each coating-attached glass sheet. The droplet was allowed to run down the coating surface by changing the position of the glass sheet such that a principal surface thereof faced a vertical direction. After that, tap water was poured on the coating surface for 5 seconds, and how much a track of the droplet that ran down had faded was checked. The coating surface was observed in the same manner as described above, namely, by allowing light from an LED light source to be incident on an edge face of the coating-attached glass sheet.

Example 1

An amount of 0.168 g of cerium(III) chloride heptahydrate (manufactured by Sigma-Aldrich Co., LLC.; 99.9%) was dissolved in 2 mL of anhydrous methanol (manufactured by Sigma-Aldrich Co., LLC.) to obtain a colorless, transparent cerium(III) chloride solution. This solution contains 9.6 mass % cerium(III) chloride. Next, 1.75 g of the cerium(III) chloride solution and 0.859 g of propylene oxide (manufactured by TIC; ≥99.0%) were mixed to obtain an undiluted solution. In the undiluted solution, a molar ratio between Ce and propylene oxide is 1:33.0. An amount of 2.609 g of the undiluted solution was diluted with 2.37 g of ethanol (manufactured by KANTO CHEMICAL CO., INC.; 99.5%) to obtain a coating liquid. In the coating liquid, the concentration of $CeCl_3$ is 0.075 mmol/L. Subsequently, the coating liquid was aged by stirring the coating liquid all night at room temperature. The coating liquid, which was colorless and transparent, turned opaque white, brown, and then light yellow during the aging. Quadruple oxidation of at least a portion of trivalent cerium ions was confirmed by evaluation of a visible-ultraviolet absorption spectrum of the coating liquid under the aging.

A highly-transmissive glass (Optiwhite (registered trademark) manufactured by Nippon Sheet Glass Co., Ltd. and having a thickness of 3 mm) was cut into a 10 $cm^2$ piece, which was washed and dried to prepare a glass substrate. The aged coating liquid was applied to the glass substrate. The application was performed for the substrate rotating at a rotation speed of 1000 rpm using a spin coater (1H-360S manufactured by Mikasa Co., Ltd.), and the rotation was kept for 10 seconds after the application. A wet film obtained through the application of the coating liquid was washed with isopropyl alcohol, and then washed with acetone. The washed wet film was held in an electric dryer set at 60° C. to obtain a coating-attached glass sheet.

Example 2

A coating-attached glass sheet was obtained in the same manner as in Example 1, except that washing with a 38% ethanol solution of cyclohexene oxide (manufactured by FUJIFILM Corporation; 95%) was performed instead of washing with acetone.

Example 3

A coating-attached glass sheet was obtained in the same manner as in Example 1, except that the molar ratio between Ce and propylene oxide in the undiluted solution of Example 1 was changed to 1:65.7.

Example 4

A coating-attached glass sheet was obtained by forming a $CeO_2$ film on a surface of a glass substrate as used in Example 1 by magnetron sputtering using a $CeO_2$ target.

Example 5

An amount of 4.04 g of cerium(III) nitrate hexahydrate (manufactured by FUJIFILM Wako Pure Chemical Corporation) was added to 268.8 g of an ethanol-based solvent mixture (FineeterA-10 manufactured by FUTABA PURE CHEMICAL CO, LTD.). Subsequently, 67.2 g of acetylacetone (manufactured by Tokyo Chemical Industry Co., Ltd.) and 60 g of propylene glycol (manufactured by FUJIFILM Wako Pure Chemical Corporation) were added, and the resulting mixture was stirred in a constant-temperature chamber at 40° C. for 24 hours to obtain a coating liquid.

A highly-transmissive, washed glass (Optiwhite (registered trademark) manufactured by Nippon Sheet Glass Co., Ltd. and having a thickness of 3 mm) having dimensions of 20 cm×30 cm was prepared as a glass substrate. The coating liquid was applied to the glass substrate by spray coating. After air-dried, the resulting film was dried in an oven at 250° C. for 10 minutes and was then fired in a muffle furnace at 760° C. for 4 minutes to obtain a coating-attached glass sheet.

Unlike in Examples 1 to 3, the coating liquid did not undergo aging in Example 5. However, in Example 5, cerium was oxidized to generate tetravalent cerium during the 10-minute drying and the 4-minute firing because cerium had been chelated by the acetylacetone. The generation of the tetravalent cerium can be confirmed, for example, by analyzing the coating film by X-ray photoelectron spectroscopy (XPS).

Example 6

A coating-attached glass sheet was obtained in the same manner as in Example 5, except that spin coating was performed to form a thinner coating than that in Example 5.

Example 7

A coating-attached glass sheet was obtained in the same manner as in Example 5, except that spin coating was performed to form a much thinner coating than that in Example 6.

Example 8

A coating-attached glass sheet was obtained in the same manner as in Example 5, except that a glass sheet on which a $SiO_2$ layer was arranged (OptiShower manufactured by Pilkington Group Limited; thickness of $SiO_2$ layer: 15 nm) was used as the glass substrate and the coating was formed on the $SiO_2$ layer.

Example 9

A coating-attached glass sheet was obtained in the same manner as in Example 5, except that a glass sheet on which a Low-E film was arranged was used as the glass substrate and the coating was formed on the Low-E film. The Low-E film was a multilayer film in which a 25 nm-thick $SnO_2$ layer, a 25 nm-thick $SiO_2$ layer, a 340 nm-thick fluorine-doped $SnO_2$ layer were stacked in this order from the glass sheet side. The Low-E film was formed by a known method using CVD.

Comparative Example 1

A coating-attached glass sheet was obtained in the same manner as in Example 1, except that the molar ratio between Ce and propylene oxide in the undiluted solution of Example 1 was changed to 1:6.7.

Comparative Example 2

A coating-attached glass sheet was obtained in the same manner as in Example 1, except that the molar ratio between Ce and propylene oxide in the undiluted solution of Example 1 was changed to 1:0, in other words, except that propylene oxide was not added.

Comparative Example 3

A glass substrate as used in Example 1 was used as it was. That is, the glass sheet of Comparative Example 3 is simply a glass sheet having no coating. It should be noted that the water contact angle of this Comparative Example was measured after the glass sheet was washed and left in air at ordinary temperature for 20 days and after the glass sheet having undergone the above thermal treatment was left in air at ordinary temperature for 40 days.

TABLE 1

| | Ce:Epoxy (molar ratio) | Thickness (nm) | Porosity (%) | Contact angle (°) | Visible transmittance (%) | Visible reflectance (%) | Haze ratio (%) |
|---|---|---|---|---|---|---|---|
| Example 1 | 1:33 | 109.9 | 42 | 98.2 | 89.73 | 6.4 | 3.14 |
| Example 1 after thermal treatment | 1:33 | 61.4 | 42 | 85.7 | 86.77 | 9.7 | 2.42 |
| Example 2 | 1:33 | | 42 | 82.9 | | | |
| Example 2 after thermal treatment | 1:33 | | 42 | 95.1 | 85.71 | 8.3 | 3.05 |
| Example 3 | 1:65.7 | | | 80.5 | | | |
| Example 4 | 1:0 | 288 | 0 | 84.2 | 80.60 | 19.1 | 0.22 |
| Example 4 after thermal treatment | 1:0 | | 0 | 75.4 | 82.13 | 18.7 | 0.25 |
| Example 5 after thermal treatment | 1:0 | 25 | | 102.8 | 87.9 | 8.2 | 0.10 |
| Example 6 after thermal treatment | 1:0 | 18 | | 82.3 | 89.1 | | 0.09 |
| Example 7 after thermal treatment | 1:0 | 13 | | 78.2 | 89.6 | | 0.09 |
| Example 8 after thermal treatment | 1:0 | 25 | | 76.0 | 89.0 | | 0.09 |
| Example 9 after thermal treatment | 1:0 | 25 | | 87.2 | 82.0 | | 0.39 |
| Comparative Example 1 | 1:6.7 | | | 50.2 | | 6.3 | 7.91 |
| Comparative Example 2 | 1:0 | | | 50.2 | | 6.3 | 7.91 |
| Comparative Example 3 | 0 | 0 | — | 15 | 91.31 | 4.2 | 0.03 |
| Comparative Example 3 after thermal treatment | 0 | 0 | — | 20 | 91.31 | 4.2 | 0.03 |

A pink interference color was observed in Example 4, while no interference colors attributable to the coatings were observed in other Examples. In Example 1, the water contact angle was less than 70° shortly after the coating formation, but gradually increased thereafter. On the other hand, the contact angle measured for Example 2 had been 70° or more since shortly after the coating formation. Additionally, the water contact angle was also measured for each Working Example 100 days after the coating formation and the thermal treatment. In each case, the measurement value was at 700 or more and was stable. The storage until the 100th day was also performed in air at ordinary temperature.

In Examples 2 and 3, as in Example 1, absorption edges of absorption spectra of the coating liquids shifted to the long wavelength side during the aging. On the other hand, in Comparative Examples 1 and 2, shifts of absorption edges to the long wavelength side were not observed during the aging.

Figure 3:
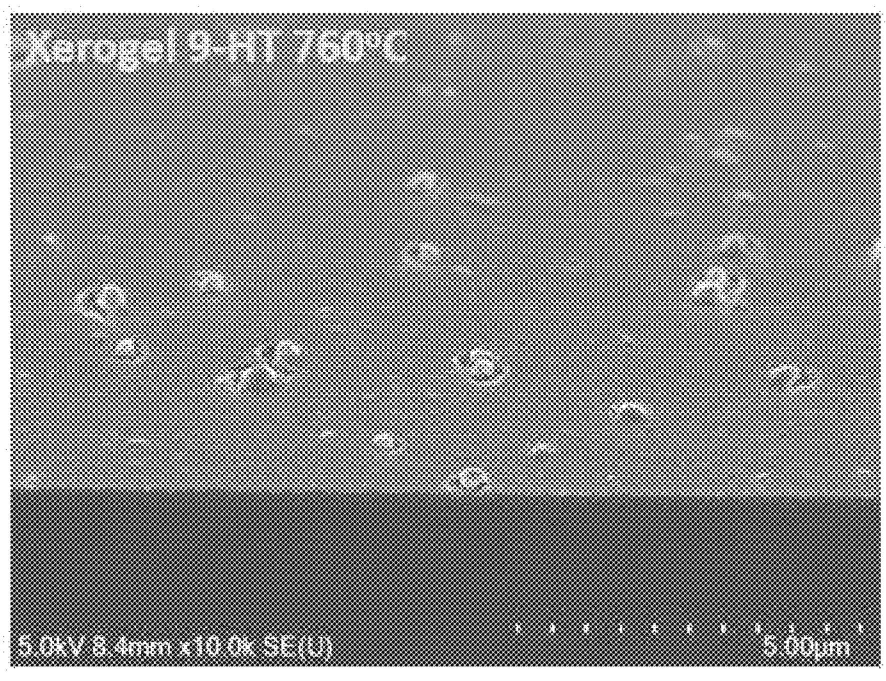
FIG. 3 shows the result of scanning electron microscope (SEM) observation of a coating-attached glass article produced in Example 1.
Figure 4:
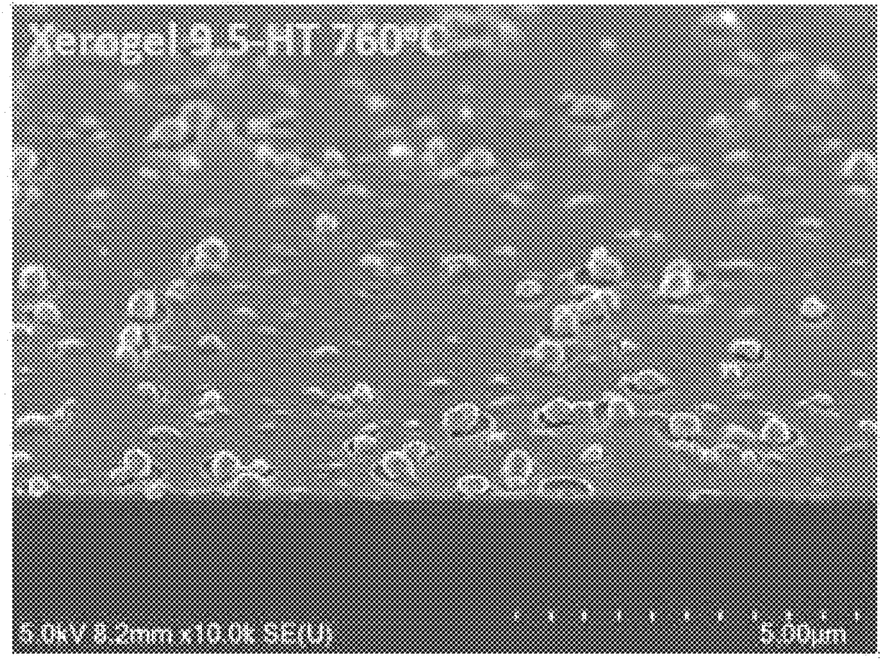
FIG. 4 shows the result of SEM observation of a coating-attached glass article produced in Example 2.
Figure 5:
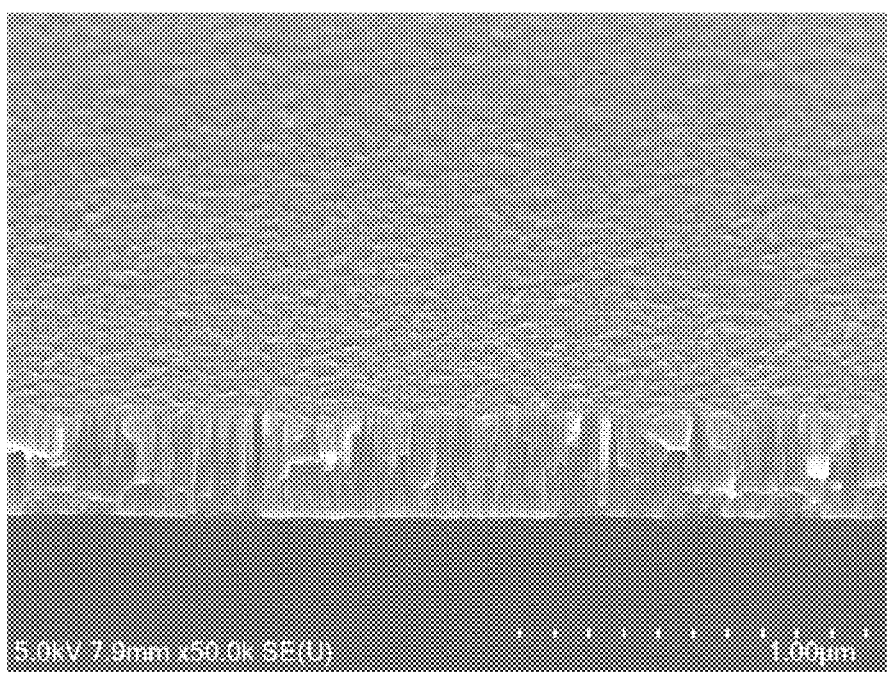
FIG. 5 shows the result of SEM observation of a coating-attached glass article produced in Example 4.
Figure 6:
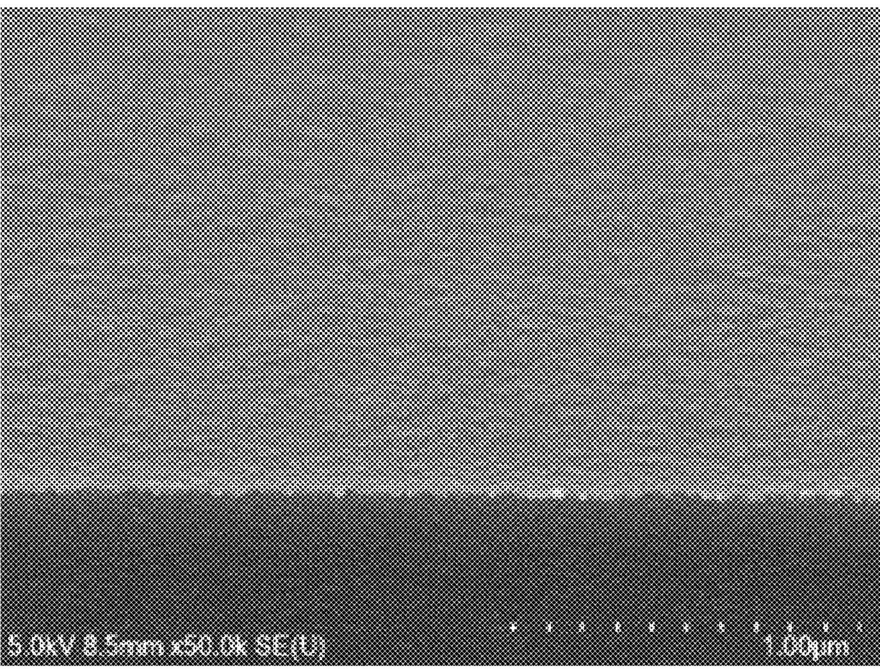
FIG. 6 shows the result of SEM observation of a coating-attached glass article produced in Example 5.

For Examples 1, 2, 4, and 5, the surfaces of the coatings were observed using a SEM after the thermal treatment. FIG. 3 (Example 1), FIG. 4 (Example 2), FIG. 5 (Example 4), and FIG. 6 (Example 5) show the results. The surfaces of the coatings of Examples 1 and 2 were substantially flat, but fine cerium oxide particles on the surfaces provided small irregularities. A larger number of fine cerium oxide particles was confirmed on the coating surface of Example 2 (FIG. 4) than on that of Example 1 (FIG. 3).

Examples 8 and 9 in which the glass sheet having, for example, a $SiO_2$ layer thereon as an underlayer was used had a lower water contact angle than Example 5 in which the coating was arranged directly on the surface of the glass sheet. This is thought to be due to prevention of diffusive movement of glass components from the glass sheet to the coating.

A crystallite size of cerium oxide after the thermal treatment was measured by an X-ray diffraction method. The crystallite size was 4.85 nm for Example 1, and 2.10 nm for Example 2. It is thought that in Example 2, the epoxy-containing organic compound (cyclohexene oxide) added hindered growth of crystallites.

Example 10

Figure 7:
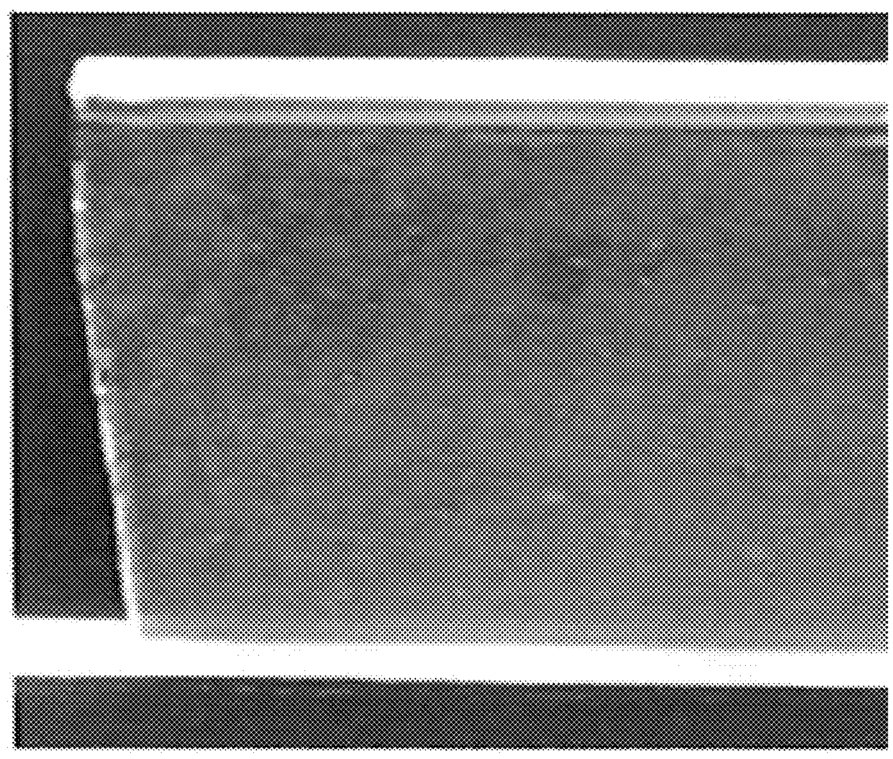
FIG. 7 shows the result of observing a dirt adhesion test: tap water performed in Example 10.

The coating-attached glass sheet produced in Example 1 (before the thermal treatment) was subjected to the dirt adhesion test: tap water. FIG. 7 shows the result.

Example 11

Figure 8:
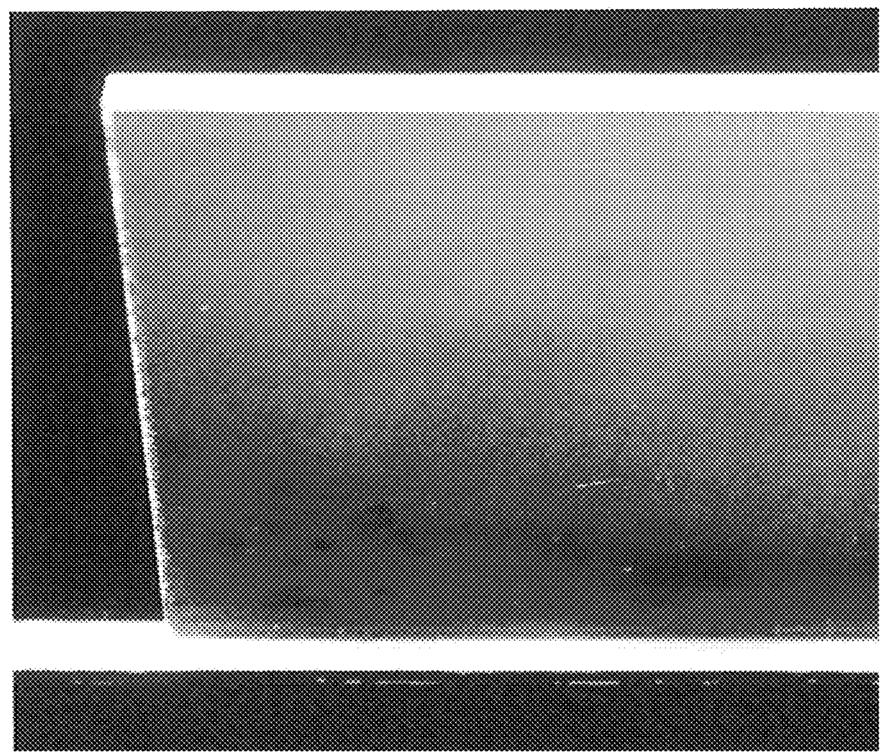
FIG. 8 shows the result of observing the dirt adhesion test: tap water performed in Example 11.

The coating-attached glass sheet produced in Example 4 (before the thermal treatment) was subjected to the dirt adhesion test: tap water. FIG. 8 shows the result.

Comparative Example 4

Figure 9:
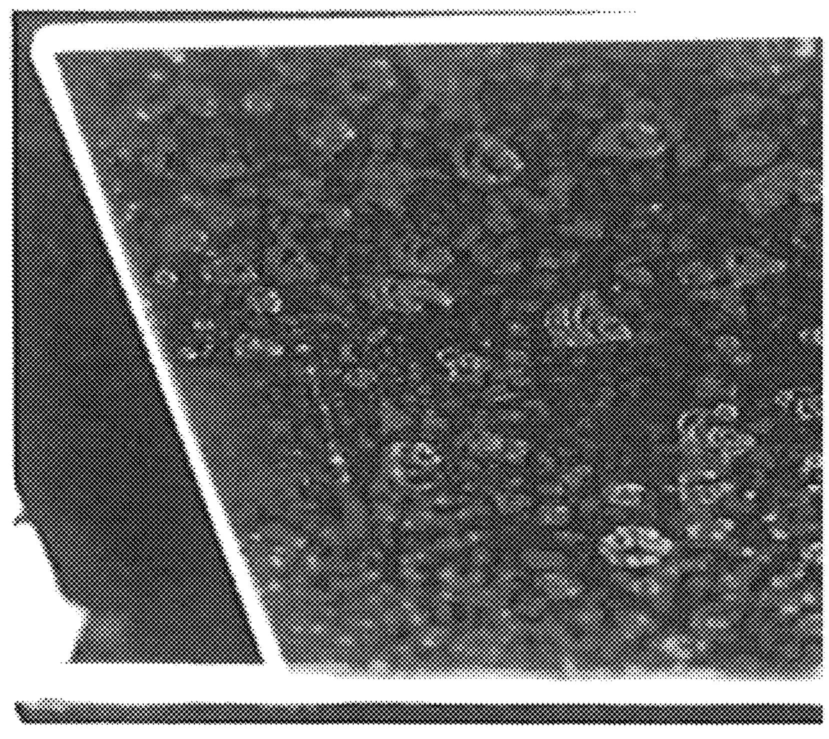
FIG. 9 shows the result of observing the dirt adhesion test: tap water performed in Comparative Example 4.

The glass sheet of Comparative Example 3 (before the thermal treatment), namely, the glass sheet on which no coating was arranged, was subjected to the dirt adhesion test: tap water. FIG. 9 shows the result.

Comparative Example 5

Figure 10:
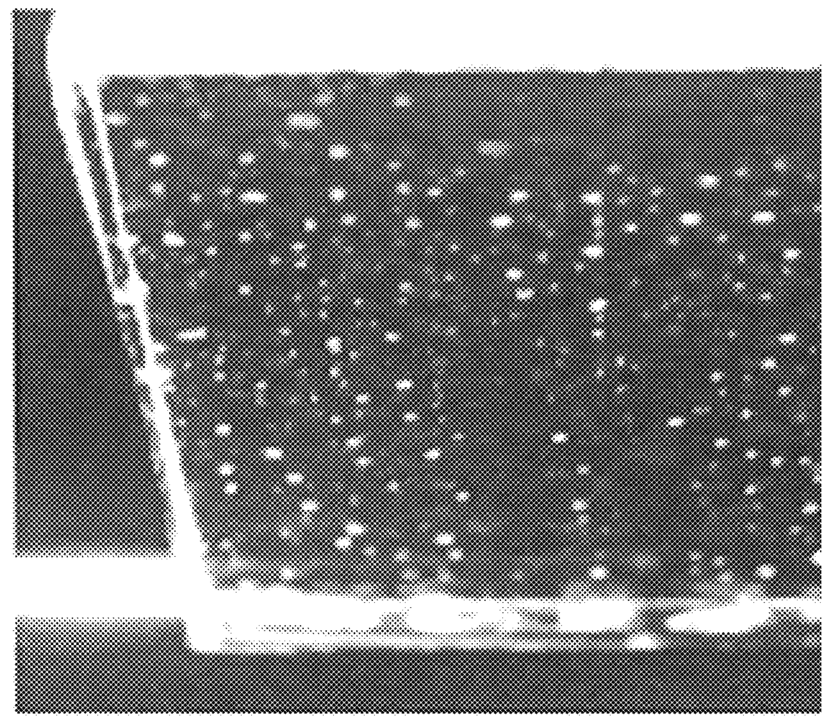
FIG. 10 shows the result of observing the dirt adhesion test: tap water performed in Comparative Example 5.

A coating was formed on a surface of a glass substrate as used in Example 1 using an antifouling coating agent. Specifically, a coating agent obtained by diluting "OPTOOL DSX-E" manufactured by DAIKIN INDUSTRIES, LTD. with a solvent ("Novec 7200" manufactured by 3M Ltd.) to 0.1 mass % was prepared, and the coating agent was sprayed on the surface of the glass substrate and dried to obtain a coating-attached glass sheet. "OPTOOL DSX-E" contains a fluoroalkyl-containing compound as a water-repellent component at a concentration of 20 mass %. The contact angle of water on the surface of the resulting coating was 93°. This coating-attached glass sheet was subjected to the dirt adhesion test: tap water. FIG. 10 shows the result.

Example 12

Figure 11A:
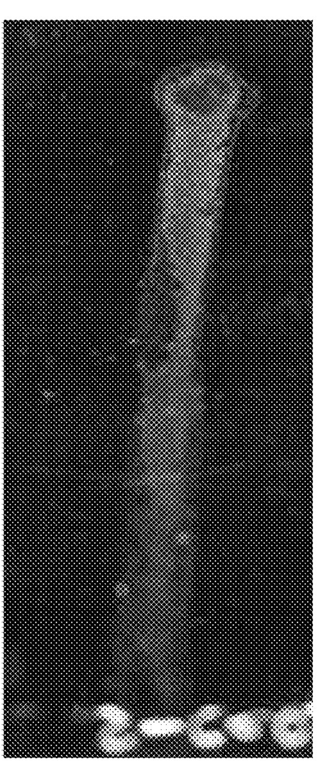
FIG. 11A shows the result of observing a dirt adhesion test: hand soap in Example 12 before washing in running water.
Figure 11B:
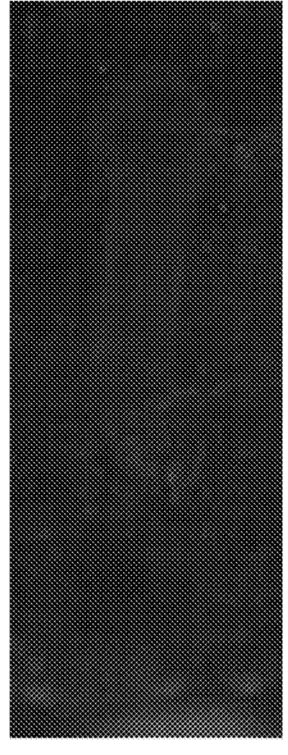
FIG. 11B shows the result of observing the dirt adhesion test: hand soap in Example 12 after washing in running water.

The coating-attached glass sheet produced in Example 4 (before the thermal treatment) was subjected to the dirt adhesion test: hand soap. FIG. 11A shows the observation result before washing with tap water, and FIG. 11B shows the observation result after the washing with tap water.

Comparative Example 6

Figure 12A:
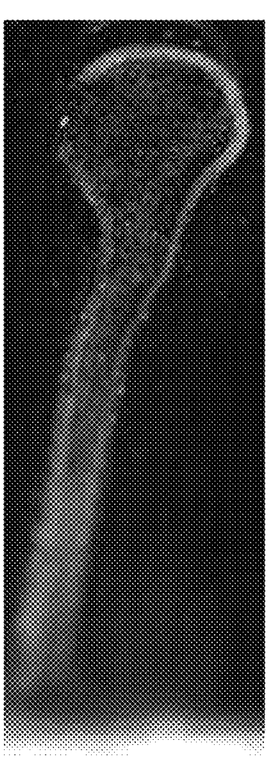
FIG. 12A shows the result of observing the dirt adhesion test: hand soap in Comparative Example 6 before washing in running water.
Figure 12B:
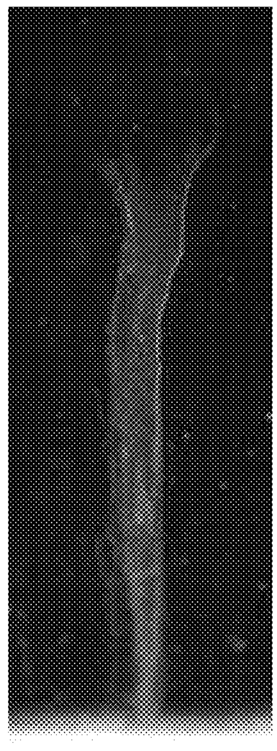
FIG. 12B shows the result of observing the dirt adhesion test: hand soap in Comparative Example 6 after washing in running water.

The glass sheet of Comparative Example 3 (before the thermal treatment), namely, the glass sheet on which no coating was arranged, was subjected to the dirt adhesion test: hand soap. FIG. 12A shows the observation result before washing with tap water, and FIG. 12B shows the observation result after the washing with tap water.

Comparative Example 7

Figure 13A:
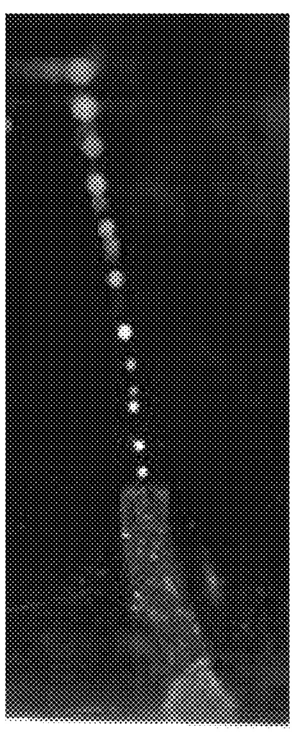
FIG. 13A shows the result of observing the dirt adhesion test: hand soap in Comparative Example 7 before washing in running water.

The coating-attached glass sheet produced in Comparative Example 5 was subjected to the dirt adhesion test: hand soap. FIG. 13A shows the observation result before washing with tap water, and FIG. 13B shows the observation result after the washing with tap water.

Ring-shaped dirt (FIG. 9) and spot-like dirt (FIG. 10) were observed in Comparative Examples 4 and 5, respectively. These dirts are noticeably observed because the dirts concentrate in particular regions of the coating surfaces. On the other hand, in Examples 10 and 11, the degree of the concentration of dirt left by evaporation of a water drop is lower, and accordingly it is difficult to visually observe the dirt (FIGS. 7 and 8). The dirts left in Examples 10 and 11 were able to be removed with ease by rubbing the dirts with cotton cloth, but those in Comparative Examples 4 and 5 remained after rubbed with cotton cloth.

Figure 13B:
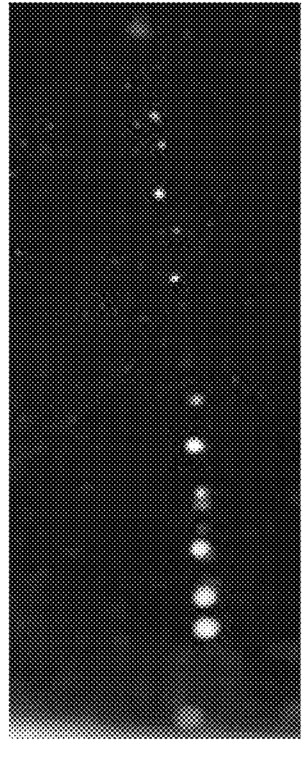
FIG. 13B shows the result of observing the dirt adhesion test: hand soap in Comparative Example 7 after washing in running water.

Dirts (FIGS. 12A and 13A) attributable to organic substances (a surfactant, etc. contained in the hand soap) on the glass surface of Comparative Example 6 and the coating of Comparative Example 7 formed of the fluorine-containing organic compound were unable to be washed off just by pouring tap water (FIGS. 12B and 13B). On the other hand, in Example 12, dirt (FIG. 11A) attributable to adhesion of the organic substances was almost completely removed just by pouring tap water (FIG. 11B).

The invention claimed is:

1. A coating-attached glass article comprising:

a glass substrate; and an easy-to-clean coating on the glass substrate, wherein the coating includes cerium oxide, the coating is substantially free of a component other than the cerium oxide, the coating has a porosity of 0%, a contact angle of water on a surface of the coating is 70° or more and 130° or less, and the coating-attached glass article is at least one selected from the group consisting of roof glass, glass for bathrooms, mirrors, display windows, counters, tables, glass doors of refrigerated cases and freezer cases, showcases of foods, glass for mobile devices, and glass for solar cells.

2. The glass article according to claim 1, wherein the glass article is glass for bathrooms.

3. The glass article according to claim 1, wherein the glass article is a mirror.

4. The glass article according to claim 1, wherein the coating has a haze ratio of 1% or less.

5. The glass article according to claim 1, wherein the coating is a single-layer film or a multi-layer film that includes the cerium oxide as a topmost layer of the multi-layer film.

6. A coating-attached glass article comprising:

a glass substrate; and an easy-to-clean coating on the glass substrate, wherein the coating includes cerium oxide, the coating is a single-layer film or a multi-layer film that includes the cerium oxide as a topmost layer of the multi-layer film, the coating has a porosity of 30% or more, and a contact angle of water on a surface of the coating is 60° or more and 95° or less.

7. The glass article according to claim 6, wherein the coating is substantially free of a fluorine-containing organic compound.

8. The glass article according to claim 6, wherein the contact angle after exposure of the glass article to a thermal treatment at 760° C. for 4 minutes is 60° or more and 95° or less.

9. The glass article according to claim 6, wherein the cerium oxide includes $CeO_2$.

10. The glass article according to claim 6, wherein an underlayer is disposed between the glass substrate and the coating.

11. The glass article according to claim 6, wherein a visible transmittance is 65% or more.

12. The glass article according to claim 6, wherein a thickness of the coating is 5 to 500 nm.

* * * * *